United States Patent
Bradford et al.

(10) Patent No.: US 10,067,019 B2
(45) Date of Patent: Sep. 4, 2018

(54) FORCE AND TORQUE SENSOR HAVING REDUNDANT INSTRUMENTATION AND OPERATIVE TO DETECT FAULTS

(71) Applicant: ATI Industrial Automation, Inc., Apex, NC (US)

(72) Inventors: Everett Lester Bradford, Apex, NC (US); Dwayne Perry, Apex, NC (US)

(73) Assignee: ATI Industrial Automation, Inc., Apex, NC (US)

( * ) Notice: Subject to any disclaimer, the term of this patent is extended or adjusted under 35 U.S.C. 154(b) by 0 days.

(21) Appl. No.: 15/401,232

(22) Filed: Jan. 9, 2017

(65) Prior Publication Data

US 2017/0211999 A1    Jul. 27, 2017

Related U.S. Application Data

(60) Provisional application No. 62/286,905, filed on Jan. 25, 2016.

(51) Int. Cl.

| | |
|---|---|
| *G01L 5/00* | (2006.01) |
| *B25J 13/08* | (2006.01) |
| *B25J 19/00* | (2006.01) |
| *G01L 1/22* | (2006.01) |
| *G01L 3/10* | (2006.01) |
| *G01L 25/00* | (2006.01) |

(52) U.S. Cl.
CPC ........... *G01L 5/0066* (2013.01); *B25J 13/085* (2013.01); *B25J 19/0095* (2013.01); *G01L 1/225* (2013.01); *G01L 3/108* (2013.01); *G01L 25/003* (2013.01); *G05B 2219/39024* (2013.01); *G05B 2219/39529* (2013.01)

(58) Field of Classification Search
CPC ..... G01L 5/0066; G01L 1/225; G01L 25/003; G01L 3/108; B25J 13/08; B25J 19/0095
USPC ...................... 73/862.331–862.338, 862.325, 73/862.041–862.046, 862.014–862.046
See application file for complete search history.

(56) References Cited

U.S. PATENT DOCUMENTS

| | | | | |
|---|---|---|---|---|
| 4,178,799 A | * | 12/1979 | Schmieder | ............... B23Q 1/34 73/862.045 |
| 4,573,362 A | * | 3/1986 | Amlani | ................. G01L 1/2218 73/862.044 |
| 4,969,366 A | | 11/1990 | Okada | |

(Continued)

FOREIGN PATENT DOCUMENTS

| | | |
|---|---|---|
| DE | 10217019 C1 | 7/2003 |
| DE | 102006004283 A1 | 8/2007 |
| DE | 102011106302 * | 9/2012 |

*Primary Examiner* — Harshad R Patel
*Assistant Examiner* — Octavia Hollington
(74) *Attorney, Agent, or Firm* — Coats & Bennett, PLLC

(57) ABSTRACT

A force/torque sensor includes a number n of deformable beams connecting the TAP to the MAP, wherein n≥4. At least four of the n deformable beams are instrumented with strain gages affixed to surfaces of the beams, such that each beam outputs two gage signals. The eight gage signals are grouped into four sets of six gage signals, such that each set includes the gage signals from three of the four instrumented beams. Each set of six gage signals is multiplied by a calibration matrix to yield a set of six force and torque values. The four sets of force and torque values are compared. If one set disagrees with the other three by greater than a predetermined tolerance, a sensor fault is signaled.

11 Claims, 8 Drawing Sheets

(56) References Cited

U.S. PATENT DOCUMENTS

| | | | |
|---|---|---|---|
| 5,969,268 A * | 10/1999 | Sommerfeld | G01L 5/161 73/862.041 |
| 6,951,142 B2 | 10/2005 | Ohsato et al. | |
| 9,038,484 B2 * | 5/2015 | Seibold | G01L 5/161 73/862.045 |
| 9,448,128 B2 * | 9/2016 | Kim | G01L 5/161 |

* cited by examiner $$[g_0 \ g_1 \ g_2 \ g_3 \ g_4 \ g_5] \times \begin{bmatrix} k_{01} & k_{11} & k_{21} & k_{31} & k_{41} & k_{51} \\ k_{02} & k_{12} & k_{22} & k_{32} & k_{42} & k_{52} \\ k_{03} & k_{13} & k_{23} & k_{33} & k_{43} & k_{53} \\ k_{04} & k_{14} & k_{24} & k_{34} & k_{44} & k_{54} \\ k_{05} & k_{15} & k_{25} & k_{35} & k_{45} & k_{55} \\ k_{06} & k_{16} & k_{26} & k_{36} & k_{46} & k_{56} \end{bmatrix} = [f_x \ f_y \ f_z \ t_x \ t_y \ t_z]$$

CALIBRATION MATRIX 1

$$[g_2 \ g_3 \ g_4 \ g_5 \ g_6 \ g_7] \times \begin{bmatrix} k_{01} & k_{11} & k_{21} & k_{31} & k_{41} & k_{51} \\ k_{02} & k_{12} & k_{22} & k_{32} & k_{42} & k_{52} \\ k_{03} & k_{13} & k_{23} & k_{33} & k_{43} & k_{53} \\ k_{04} & k_{14} & k_{24} & k_{34} & k_{44} & k_{54} \\ k_{05} & k_{15} & k_{25} & k_{35} & k_{45} & k_{55} \\ k_{06} & k_{16} & k_{26} & k_{36} & k_{46} & k_{56} \end{bmatrix} = [f_x \ f_y \ f_z \ t_x \ t_y \ t_z]$$

CALIBRATION MATRIX 2

$$[g_0 \ g_1 \ g_4 \ g_5 \ g_6 \ g_7] \times \begin{bmatrix} k_{01} & k_{11} & k_{21} & k_{31} & k_{41} & k_{51} \\ k_{02} & k_{12} & k_{22} & k_{32} & k_{42} & k_{52} \\ k_{03} & k_{13} & k_{23} & k_{33} & k_{43} & k_{53} \\ k_{04} & k_{14} & k_{24} & k_{34} & k_{44} & k_{54} \\ k_{05} & k_{15} & k_{25} & k_{35} & k_{45} & k_{55} \\ k_{06} & k_{16} & k_{26} & k_{36} & k_{46} & k_{56} \end{bmatrix} = [f_x \ f_y \ f_z \ t_x \ t_y \ t_z]$$

CALIBRATION MATRIX 3

$$[g_0 \ g_1 \ g_2 \ g_3 \ g_6 \ g_7] \times \begin{bmatrix} k_{01} & k_{11} & k_{21} & k_{31} & k_{41} & k_{51} \\ k_{02} & k_{12} & k_{22} & k_{32} & k_{42} & k_{52} \\ k_{03} & k_{13} & k_{23} & k_{33} & k_{43} & k_{53} \\ k_{04} & k_{14} & k_{24} & k_{34} & k_{44} & k_{54} \\ k_{05} & k_{15} & k_{25} & k_{35} & k_{45} & k_{55} \\ k_{06} & k_{16} & k_{26} & k_{36} & k_{46} & k_{56} \end{bmatrix} = [f_x \ f_y \ f_z \ t_x \ t_y \ t_z]$$

CALIBRATION MATRIX 4

*FIG. 7*

FORCE AND TORQUE SENSOR HAVING REDUNDANT INSTRUMENTATION AND OPERATIVE TO DETECT FAULTS

CROSS-REFERENCE TO RELATED APPLICATIONS

This application is a non-provisional patent application which claims the benefit of U.S. Provisional Patent Application No. 62/286,905, filed Jan. 25, 2016, which is hereby incorporated by reference in its entirety.

FIELD OF INVENTION

The present invention relates generally to a force/torque sensor for robotic applications, and in particular to a force/torque having redundant instrumentation and operative to detect and signal a fault based on a comparison of force and torque values derived from different sets of gage signals.

BACKGROUND

Robotics is a growing, and increasingly important, field in industrial, medical, scientific, and other applications. In many cases, in which a robot arm or a tool attached thereto contacts a workpiece, the force and/or torque applied must be closely monitored. Accordingly, a force/torque sensor is an important part of many robotic systems.

One conventional type of force/torque sensor uses strain gages to measure the deformation of small beams connecting two mechanical parts—one connected to the robot arm and the other connected to a robotic tool (or a mechanical coupling to the tool). For example, a central "hub," referred to in the art as a Tool Adapter Plate (TAP) is connected to a tool. Another body arranged annularly around, and spaced apart from, the TAP, referred to in the art as a Mounting Adapter Plate (MAP), is connected to a robotic arm. The MAP and TAP are connected to each other by a plurality of relatively thin (and hence mechanically deformable) beams, arranged radially around the TAP—in some cases resembling spokes of a wheel. Relative force or torque between objects respectively attached to the TAP and MAP attempt to move the MAP relative to the TAP, resulting in slight deformation, or bending, of at least some of the beams.

Strain gages are typically affixed to all four surfaces of each beam, nominally in the center of each respective surface. The gages translate tensile and compressive strains at the beams' surfaces, caused by mechanical deformation of the beams, into electrical signals. Once calibrated, signals from all four strain gages on all beams are processed together to resolve the magnitude and direction of relative force and/or torque between the robot arm and tool (and hence the force/torque applied through the tool to a workpiece).

Safety is a paramount concern in any industrial environment in which both humans and robots operate. A force/torque sensor on a robotic is an important aspect of maintaining safety, as it allows the robotic control system to detect a collision or contact with an object (which may be a person), and interrupt ongoing movement to avoid possible damage. It is thus critical that the force/torque sensor be able to accurately measure and report applied loads at all times. If a force/torque sensor were to experience a fault—such as, for example, catastrophic failure of a strain gage (open circuit), partial strain gage failure (resistance offset), strain gage delamination, yield of metal components such as a deformable beam, wiring faults (open or short circuit), or failure of a measurement/processing circuit component—the operational effect would be the same as having a robot without a force/torque sensor at all; this is an unacceptable safety risk. Accordingly, a force/torque sensor, for at least some applications, must be capable of detecting and reporting any faults, even if the damage occurs when the system is not powered on.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, a force/torque sensor includes a number n of deformable beams connecting the TAP to the MAP, wherein $n \geq 4$. At least four of the n deformable beams are instrumented with strain gages affixed to surfaces of the beams, such that each beam outputs two gage signals. The eight gage signals are grouped into four sets of six gage signals, such that each set includes the gage signals from three of the four instrumented beams. Each set of six gage signals is multiplied by a calibration matrix to yield a set of six force and torque values. The four sets of force and torque values are compared. If one set disagrees with the other three by greater than a predetermined tolerance, a sensor fault is signaled.

One embodiment relates to a force/torque sensor. The sensor includes a Tool Adapter Plate (TAP) operative to be connected to a first object, and a Mounting Adapter Plate (MAP) operative to be connected to a second object. The sensor also includes a number n of deformable beams connecting the TAP to the MAP, wherein $n \geq 4$, and instrumentation comprising strain gages affixed to surfaces of four of the n deformable beams. The sensor further includes a measurement circuit, which is operative to separately resolve the direction and magnitude of force and torque between the first and second objects, in response to electrical signals from strain gages on four different combinations of three of the four instrumented beams; compare the resolved force and torque outputs of the four resolutions; and signal a fault if at least one of the four force/torque outputs differs from the others by more than a predetermined tolerance.

Another embodiment relates to a method of detecting a fault in a calibrated force/torque sensor having a number n of deformable beams, wherein $n \geq 4$, and wherein four of the n deformable beams are instrumented so as to generate two gage signals each. Eight gage signals are iteratively sampled from the four instrumented beams. The eight gage signals are grouped into four unique sets of six signals each, wherein each set includes gage signals from three of the four instrumented beams. Each set of six sampled gage signals is multiplied by a separate calibration matrix relating that set to force and torque values to yield four resulting sets of force and torque values. Either one set of force and torque values, or the average of the four sets of force and torque values, is output. The four sets of force and torque values are compared. If one of the four sets of force and torque values differs from the other three by more than a predetermined tolerance, a sensor fault is signaled.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

FIG. 7 depicts four matrix equations mapping gage outputs to resolved forces and torques.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Figure 1:
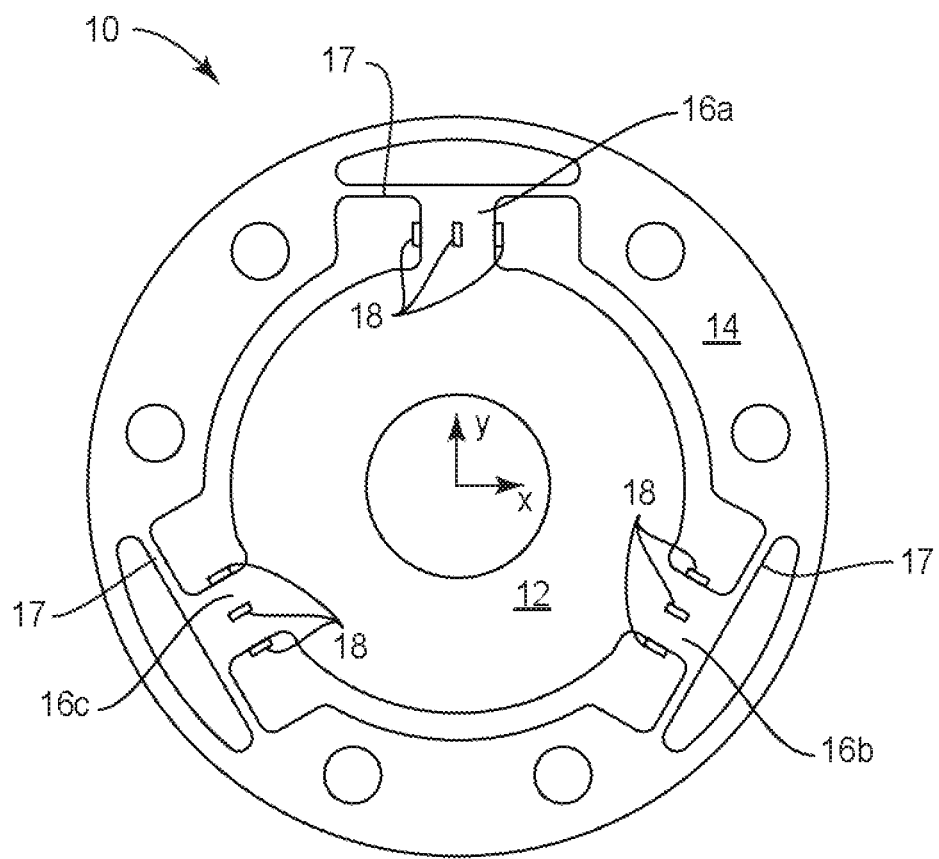
FIG. 1 is a plan view of a prior art, 3-beam force/torque sensor.

FIG. 1 depicts a plan view of a conventional force/torque sensor 10 having three deformable beams 16a, 16b, 16c connecting a TAP 12 to a MAP 14. Four strain gages 18 are affixed to each beam 16—one on each surface (the lower surface gage not visible in FIG. 1).

Figure 2:
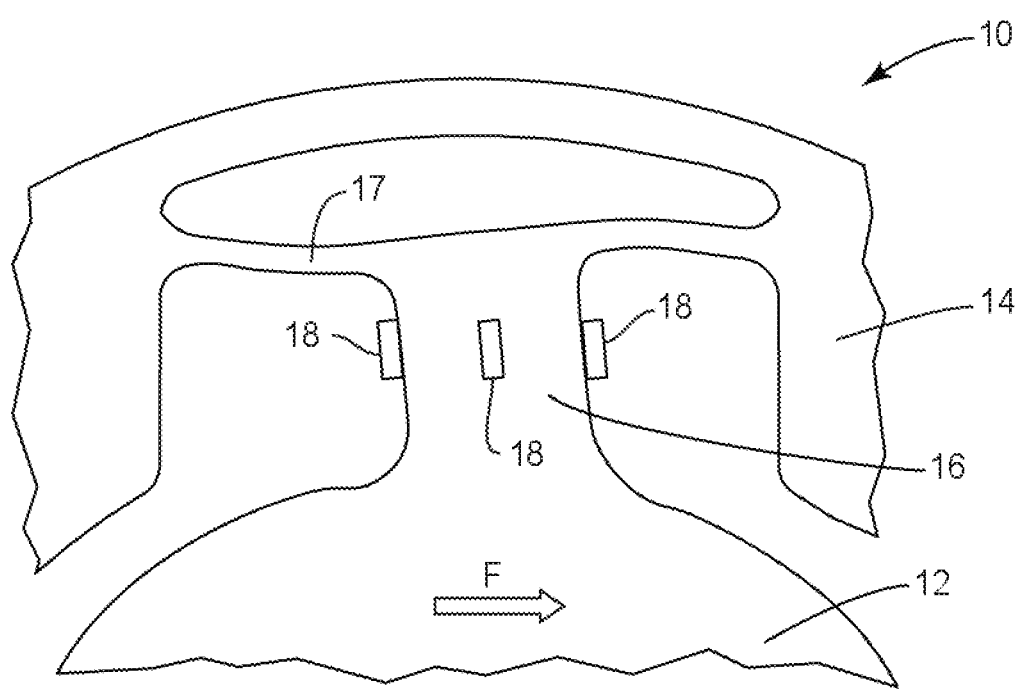
FIG. 2 is an enlarged view of one beam of the prior art force/torque sensor of FIG. 1.

FIG. 2 is an enlarged view of one beam 16 undergoing deformation due to a force F applied to the TAP 12, relative to the MAP 14. This force deforms the beam 16 slightly to the left (the figure is not to scale). A compressive force is induced on the left surface of beam 16, which is sensed by the strain gage 18 attached to that side; the gage 18 outputs a signal of one polarity, with a magnitude proportional to the sensed deformation. Simultaneously, a tensile force is induced on the right surface, which is sensed by the strain gage 18 attached to that side; the right gage 18 outputs a signal of opposite polarity, with a magnitude proportional to the sensed deformation. The strain gage 18 on the upper surface (like the one on the lower surface) experiences little or no deformation, as it lies along the neutral axis of that side of the beam 16; this gage 18 outputs little or no signal. The neutral axis is a line, running generally down the center of each surface of the beam 16, at which compressive strain experienced on the left side of the beam 16 transitions to tensile strain on the right side. Accordingly, the beam 16 undergoes no strain at the neutral axis.

Figure 3:
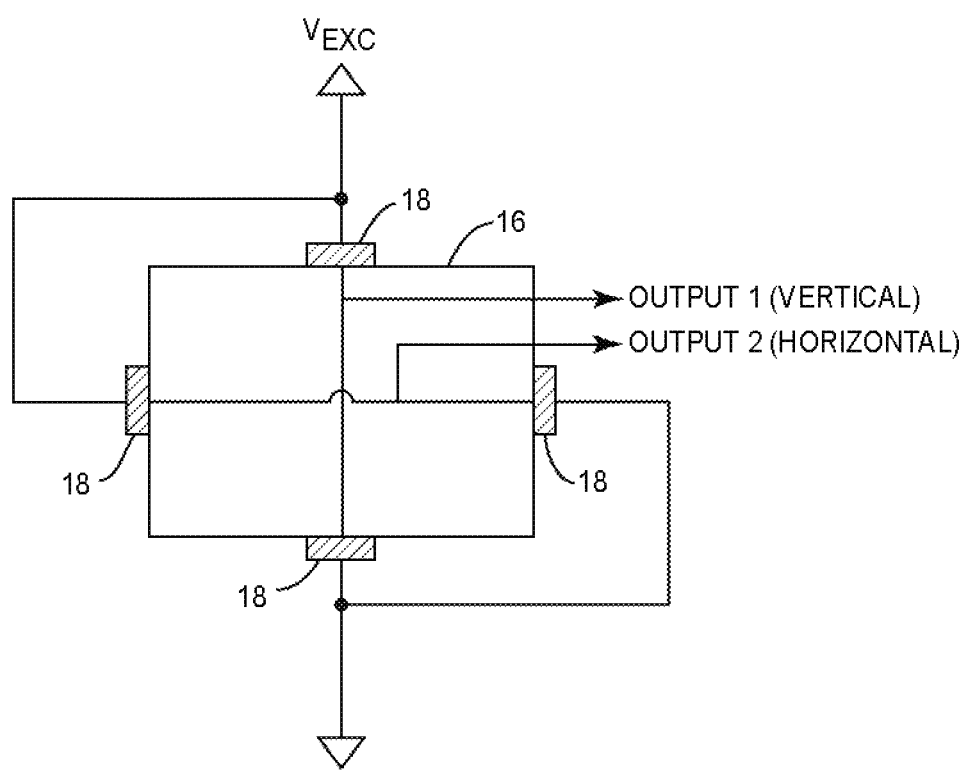
FIG. 3 is a section view and functional circuit schematic of a prior art half bridge circuit topology of strain gages on a beam.

FIG. 3 depicts a cross-section of an instrumented beam 16, having a strain gage 18 affixed to each surface thereof. The gages 18 are wired in a half-bridge configuration between an excitation voltage and ground, generating two outputs, labeled vertical and horizontal for reference. In the circuit of FIG. 3, a force or torque deforming the beam 16 in the vertical direction would output a large signal on output1, and small or no signal on output2. A force or torque deforming the beam 16 in the horizontal direction would generate the opposite signals on the outputs.

The gages 18 on each beam 16a, 16b, 16c thus generate six signals—two signals from each beam, each signal generated by the half-bridge wired gages 18 on opposite sides of the beam. By multiplying the six signals by a calibration matrix, six forces and torques may be resolved (Fx, Fy, Fz, Tx, Ty, Tz). The force/torque sensor 10 thus exhibits a compact, efficient design, employing the minimum number of beams 16 and strain gages 18 (for the half bridge configuration) to uniquely resolve six force and torque inputs.

The sensor 10 depicted in FIG. 1 is susceptible to a single point of failure, such as failure of a beam 16, one or more strain gages 18, a wiring fault, or the like. Indeed, not only could the sensor 10 not accurately resolve all applied force/torque loads in the face of such a fault, but depending the specific fault, the sensor 10 may be unable to detect that it even has a fault. In this case, a robot lacking the ability to accurately detect and resolve applied loads may be inadvertently operated, presenting an unacceptable safety risk.

One straightforward and well-known approach to fault detection and robust operation is redundancy. Hence, one may readily envision simply adding a fourth instrumented, deformable beam to the design of the sensor depicted in FIG. 1. By separately resolving the signals from different combinations of three of the four beams 16 and comparing the results, a failure of any beam, gage, gage wiring, etc., could then be detected. The force/torque sensor may then be operated using only the three remaining, operative, instrumented beams. One problem with this approach is that, to obtain consistent stiffness in all radial directions, the deformable beams of a force/torque sensor should be evenly spaced apart radially around the hub. For four beams, this means a configuration resulting in co-linearity of beams (e.g., "+" or "x" configuration). If one beam or its instrumentation were to experience a fault, the remaining beams would be in a "T" configuration. In this orientation, on the base leg, some applied torques and forces cannot be distinguished. Accordingly, while the four-beam solution is within the scope of the present invention, it is not a preferred embodiment.

According to embodiments of the present invention, a force/torque sensor comprises n deformable beams, where ≥4, and preferably where n≥5, generally evenly spaced apart radially around a hub. Of these n beams, at least four are instrumented by affixing strain gages thereto. Thus, if one beam or its instrumentation experiences a fault, a minimum of three instrumented beams remain operational, and capable of, at a minimum, detecting a fault. Preferably, the three operational instrumented beams remain capable of measuring and reporting all forces and torques between the TAP and MAP. The beams to be instrumented should be selected so as to provide coverage at least generally around the radial extent of the sensor, but without being co-linear with other instrumented beams, where possible.

A configuration that provides good stiffness and inherently avoids the co-linearity problem is a sensor having five deformable beams connecting the TAP to the MAP, of which four are instrumented with strain gages. Disposing the five beams evenly spaced apart radially around the TAP ensures that none of them are co-linear. Four beams is the minimum number that may be instrumented which guarantees the ability to at least detect a fault in one beam or instrumentation circuit. Accordingly, further discussion herein is made with reference to a 5-beam sensor having four of the five beams instrumented. However, the present invention is not limited to this configuration.

Such a 5-beam sensor has, in one embodiment, eight strain gage signals from four instrumented beams, and can accurately measure applied loads using only the six signals from any three of those beams. Therefore the sensor has five possible calibration matrices it can use to resolve loads— one 8×6 matrix using all signals, and four 6×6 matrices, each using the signals from a different combination of three beams. For computational efficiency, the first (8×6) matrix will usually be omitted.

When the sensor is fully functional, the resolved load outputs from any of the four matrices will produce identical outputs (within the error tolerance of the calibration). In the case of any fault that damages one beam or its instrumentation, the outputs will disagree. These four outputs may be continuously calculated and compared during operation, and if they do not match, the system may signal a fault condition. Depending upon the type of failure, it may be possible to determine which beam or its instrumentation has been damaged, and continue to resolve accurate loads following the fault by choosing the matrix which omits the signal associated with the fault.

Figure 4:
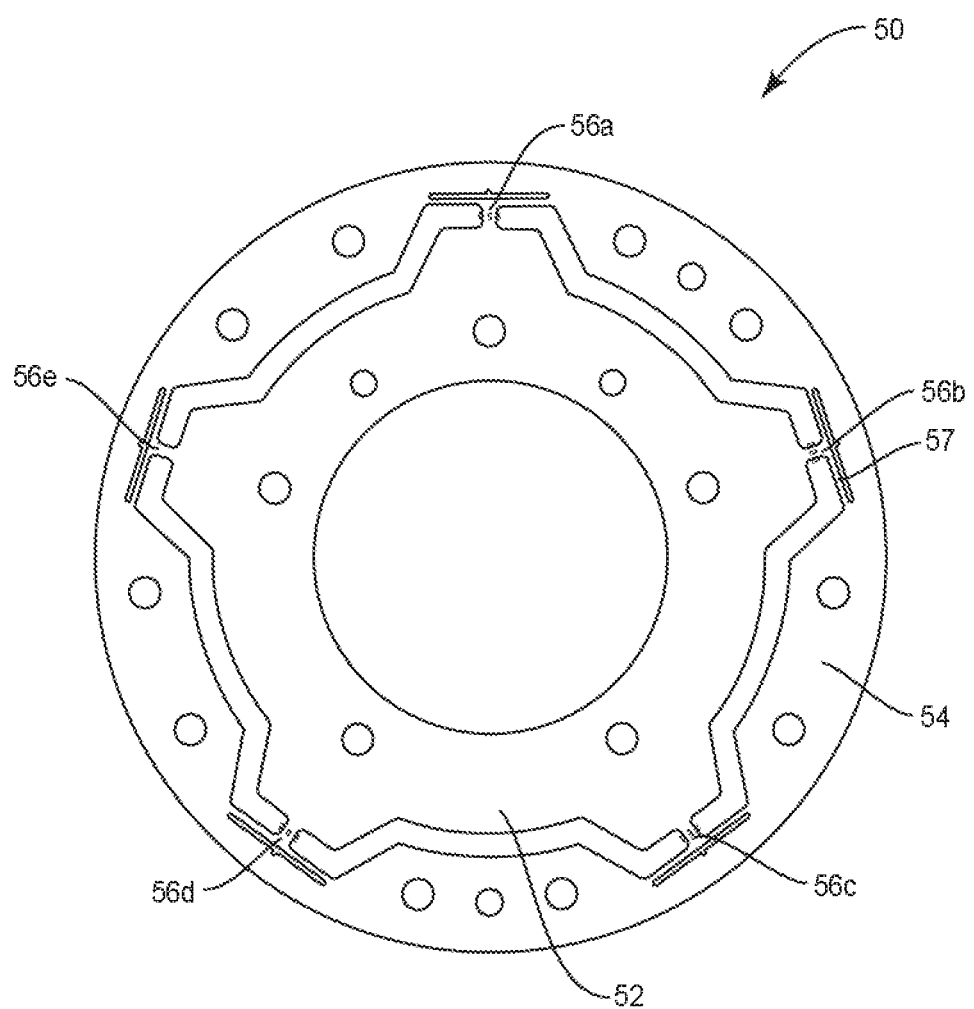
FIG. 4 is a plan view of a 5-beam force/torque sensor.
Figure 5:
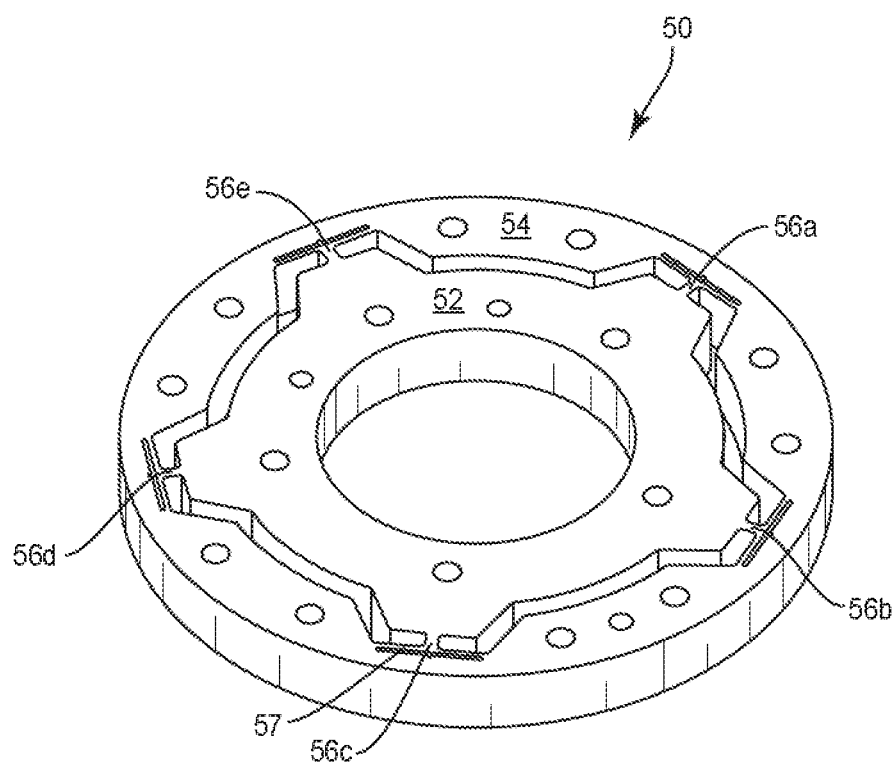
FIG. 5 is a perspective view of the 5-beam force/torque sensor of FIG. 4

FIGS. 4 and 5 depict a force/torque sensor 50 according to one embodiment of the present invention. In the sensor 50, a TAP 52 is connected to a MAP 54 by five beams 56a, 56b, 56c, 56d, and 56e, evenly spaced radially around the TAP 52. Only four of the beams 56a, 56b, 56c, and 56d are instrumented; beam 56e does not include any strain gages 58. This provides a non-symmetric configuration of beams 56, while maintaining the same stiffness in all directions.

Each beam 56 connects directly to the TAP 52, and connects to the MAP 54 by flexures 57, which aid in the deformation of the beams 56 under mechanical loading. The TAP 52 is configured to be connected to a first object, such as a robotic tool. The MAP 54 is configured to be connected to a second object, such as a robot arm. The TAP 52 and MAP 54 are only connected by the beams 56.

Although not depicted in FIGS. 4 and 5, the force/torque sensor 50 also includes a processing circuit operative to receive electrical signals from each pair of strain gages 58, and to process the signals to resolve the magnitude and direction of force(s) and torque(s) applied between the MAP 54 and TAP 52. The processing circuits resolve these forces and torques using each of four combinations of six signals (from three pairs of strain gages 58, each pair affixed to opposite sides of associated beams 56), and compare the results. A difference in the results (outside of calibration error) indicates a fault. Such processing circuits may comprise, e.g., a microprocessor coupled to memory operative to store program code and sensor calibration data.

Figure 6:
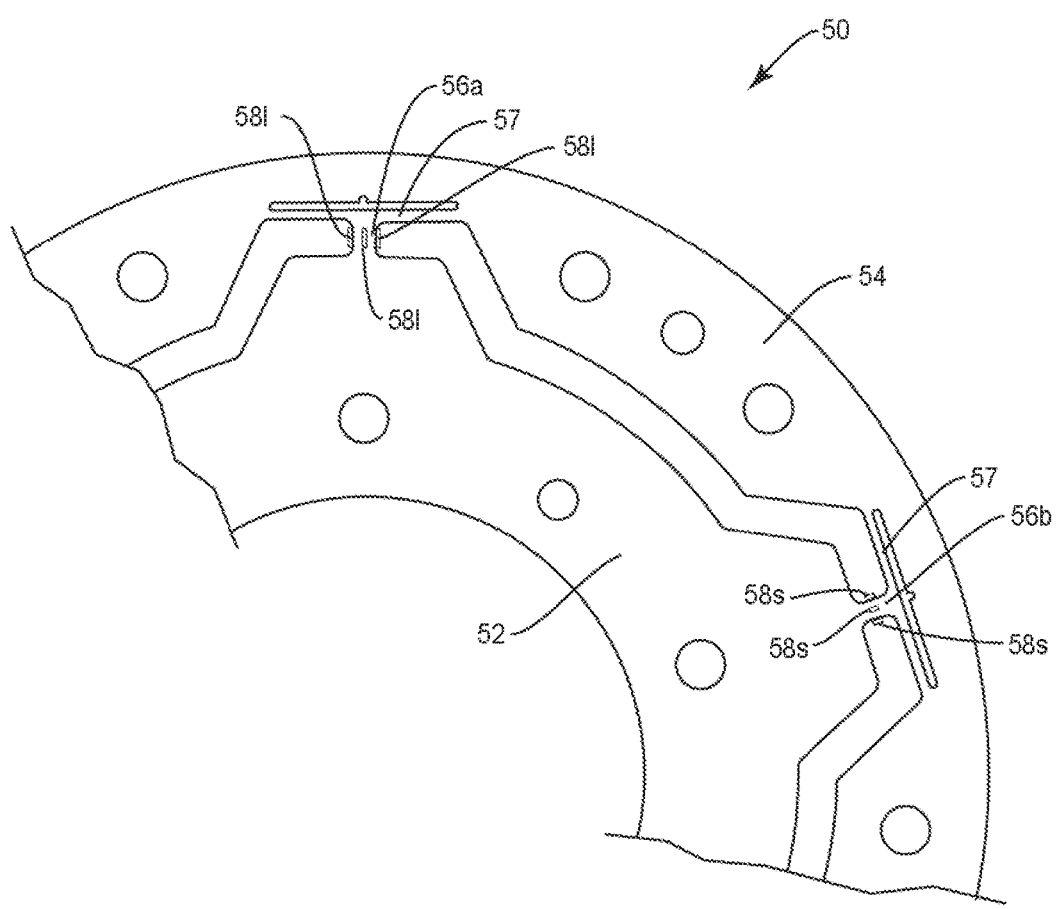
FIG. 6 is an enlarged view of two beams of the force/torque sensor of FIG. 4, depicting different strain gage lengths.

In order to account for the condition in which a perfectly Fz- or Tz-aligned overload force damaged all beams 56 equally, the four instrumented beams 56 may be gaged with two different types of strain gages 58, which have significantly different lengths, as depicted in FIG. 6. In this example, long gages 58l are affixed to instrumented beam 56a, and short gages 58s are affixed to instrumented beam 56b. Because silicon strain gages 58 are damaged by the peak strain at any single point along their active length, the longer gages 58l are ensured to fail before the shorter gages 58s, as they will reach farther inboard at the beam end into the area of higher stress concentration. The outputs of the strain gages 58l, 58s follow the average strain across their entire active length, so the two different lengths do not complicate the design of the beam 56 geometry when the two gage types 58l, 58s are centered on the same location. This different failure point on two of the beams 56, as compared with the remaining two, ensures that no overload condition can partially damage all gages 58 in exactly the same way and deceive the multi-matrix fault detection method.

The measurement electronics for the sensor 50 requires eight input channels, which are sampled simultaneously. After each sample, the eight values are run through each of four different calibration matrices, each producing six resolved forces and torques. The six outputs from each matrix are then compared, and a fault condition is raised if they disagree by more than the allowed tolerance. The outputs from any single matrix, or the average of all four, may be used to generate the reported force/torque outputs of the system. In deployments where this comparison operation taxes computational resources and limits performance, it may be done periodically at a rate less than the system's normal sample rate, so as to reduce the computational workload while still providing fault detection at a speed high enough to prevent harm to an operator.

In the event of an overload that applies sufficient force to cause the metal sensor 50 body to yield (but which does not damage gages 58), a permanent offset would be induced in one or more gage 58 pairs, causing the three matrices which incorporated that signal to disagree with the other one. If testing indicates that such an event can produce an equal static force on all beams (which appears to measure correctly), the robot can be programmed to perform a maneuver that applies one or more known loads to the sensor upon startup, in order to detect the permanent offset. This failure case assumes the damage has occurred while power is off, as any measured overload during active use would be detected by the system and recognized as a fault.

In the event of a catastrophic gage 58 failure due to overstrain or electrical damage, an open circuit will result, and that signal will saturate. This signal would immediately fail the matrix comparison test. Wring faults which produce an open or short signal would have the same result.

In the event of a partial gage 58 failure that produces an offset, the matrix comparison test would fail. It could only pass if all gages 58 are damaged in precisely the same way. If the probability of this failure mode is sufficiently high, it can be mitigated by the use of differing gage lengths, as described above with reference to FIG. 6.

In the event of strain gage 58 delamination, the failed gage 58 will no longer report applied loads, and will immediately fail the matrix comparison test.

The forces and torques applied to the sensor 50 are resolved from the gage 58 signals using a set of calibration matrices. The coefficients of each matrix may be determined by a calibration procedure, in which one or more known forces or torques are applied to the sensor 50, and its gage outputs sampled. The calibration matrix coefficients are then derived to map the actual gage outputs to the known force/torque values. Such calibration procedures are routine, are well within the knowledge and skill of those of ordinary skill in the robotic arts, and hence are not further detailed herein. The calibration matrices may be stored in memory on the sensor 50 and accessible to the processing circuits; or may alternatively be stored by a robot controller or other processing system external to the sensor 50.

One matrix for a linear calibration using all eight gage signals is possible, as shown below. Gage signals are represented by $g_0$ through $g_7$, resolved forces and torques are represented by $f_x$, $f_y$, $t_x$, etc. The matrix coefficients are represented by $k_{01}$ for the coefficient of $g_0$ for $f_x$, $k_{12}$ for the coefficient of $g_1$ for $f_y$, and so on.

$$[g_0 \ g_1 \ g_2 \ g_3 \ g_4 \ g_5 \ g_6 \ g_7] \times \begin{bmatrix} k_{01} & k_{11} & k_{21} & k_{31} & k_{41} & k_{51} & k_{61} & k_{71} \\ k_{02} & k_{12} & k_{22} & k_{32} & k_{42} & k_{52} & k_{62} & k_{72} \\ k_{03} & k_{13} & k_{23} & k_{33} & k_{43} & k_{53} & k_{63} & k_{73} \\ k_{04} & k_{14} & k_{24} & k_{34} & k_{44} & k_{54} & k_{64} & k_{74} \\ k_{05} & k_{15} & k_{25} & k_{35} & k_{45} & k_{55} & k_{65} & k_{75} \\ k_{06} & k_{16} & k_{26} & k_{36} & k_{46} & k_{56} & k_{66} & k_{76} \end{bmatrix} = [f_x \ f_y \ f_z \ t_x \ t_y \ t_z]$$

An analogous equation for linear calibration of a standard 3-beam, non-redundant sensor 10 using only six gage signals would appear as below, following the same naming conventions:

$$[g_0 \ g_1 \ g_2 \ g_3 \ g_4 \ g_5] \times \begin{bmatrix} k_{01} & k_{11} & k_{21} & k_{31} & k_{41} & k_{51} \\ k_{02} & k_{12} & k_{22} & k_{32} & k_{42} & k_{52} \\ k_{03} & k_{13} & k_{23} & k_{33} & k_{43} & k_{53} \\ k_{04} & k_{14} & k_{24} & k_{34} & k_{44} & k_{54} \\ k_{05} & k_{15} & k_{25} & k_{35} & k_{45} & k_{55} \\ k_{06} & k_{16} & k_{26} & k_{36} & k_{46} & k_{56} \end{bmatrix} = [f_x \ f_y \ f_z \ t_x \ t_y \ t_z]$$

Because only six discrete signals are required to resolve the loads, the redundant-beam sensor 50 according to embodiments of the present invention has four different 6×6 matrix options, each of which omits the two signals from one beam 56. That is, the signals from gages 58 affixed to three of the four instrumented beams 56 are sufficient to resolve the force/torque. There are four ways to combine three of four beams 56. For example, if four instrumented beams were labeled A, B, C, and D, there are four possible combinations of three of these: ABC, BCD, ACD, and ABD. All four of these are calculated and compared. If any one disagrees (by more than a predetermined tolerance), the other three have an erroneous input signal. The four matrix operations, in term of gage signal inputs, unique calibration matrices, and force/torque outputs, are depicted in FIG. 7.

Each of these matrices produces a distinct set of force and torque outputs, all of which should be nearly identical in the normal state, when all parts of the sensor 50 are functioning properly. In the case that one gage 58 signal or one beam 56 becomes nonfunctional, the three matrices that incorporate the failed element will produce incorrect results, while the fourth remains accurate. For example, if one or more gage generating the $g_1$ signal failed, only the second matrix would produce accurate results because it does not use the $g_1$ signal. In this case, the comparison software will detect the mismatch between the resolved outputs of the second matrix and those of all other matrices, and signal a fault to the host system.

While the discussion above presents detailed representations of linear calibration matrix equations, to assist those of skill in the art to understand embodiments of the invention, the invention is not limited to linear calibrations. Non-linear calibration equations utilize the same strain gage outputs, but may calculate higher order values, such as $g_0^2$, $g_1 * g_2$, $|g_0|$, and the like, along with larger calibration matrices mapping these non-linear terms to resolved forces and torques. The interested reader may find additional information on non-linear calibrations of strain gages in the American Institute of Aeronautics and Astronautics (AIAA) standard R-091-2003e, titled, "AIAA Recommended Practice for Calibration and Use of Internal Strain-Gage Balances with Application to Wind Tunnel Testing." As used herein, the term "gage signals," as used in a mapping operation to resolve force and torque values from strain gage outputs, encompasses the signals output from, e.g., the half bridge circuit depicted in FIG. 14, as well as values derived from those output signals.

Figure 8:
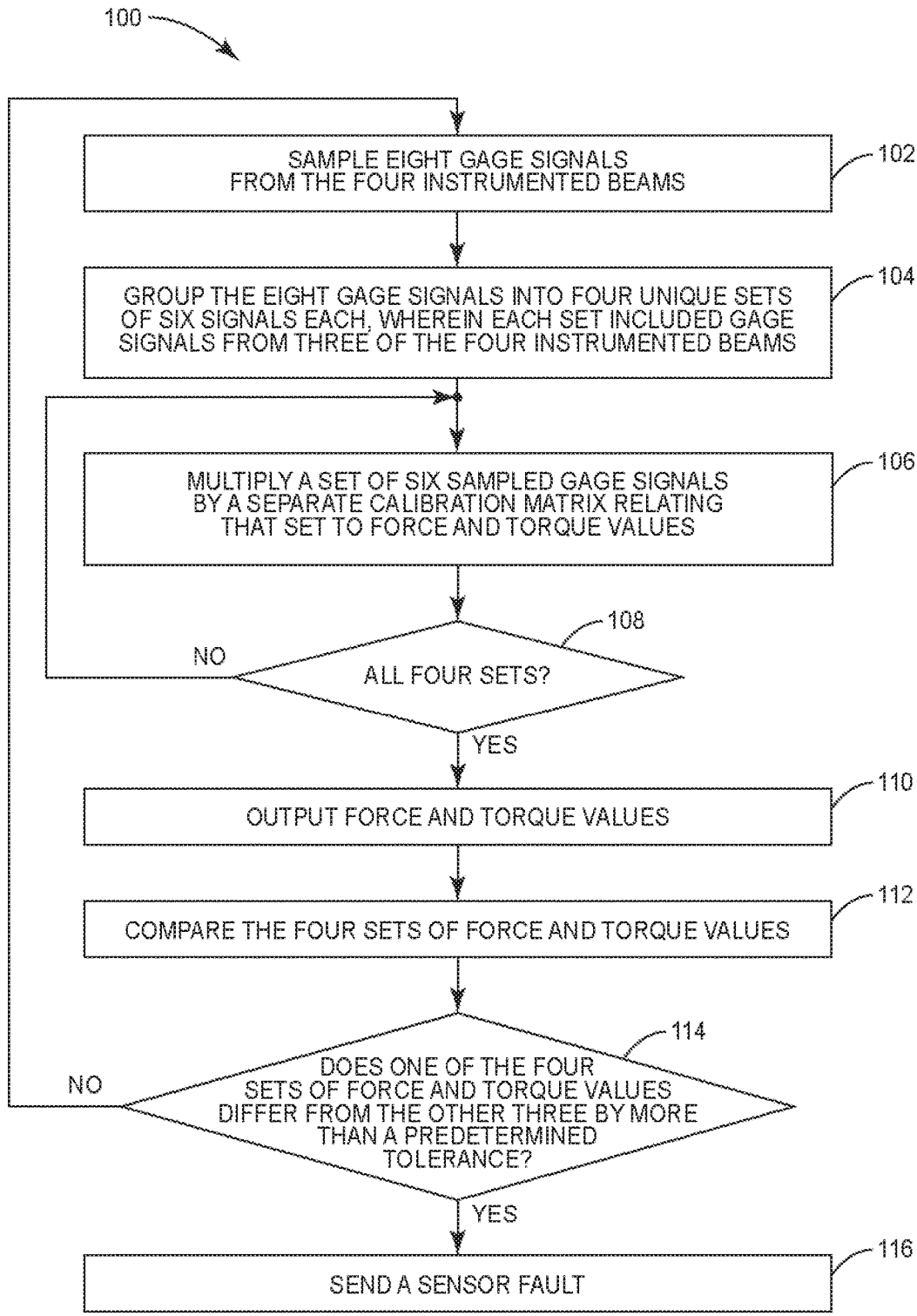
FIG. 8 is a flow chart depicting a method of detecting a fault in the force/torque sensor of FIG. 4.

FIG. 8 depicts a method 100 of detecting a fault in a calibrated force/torque sensor 50 having a number n of deformable beams 56, wherein n≥5, and wherein four of the n deformable beams 56 are instrumented so as to generate two gage 58 signals each. Eight gage 58 signals are sampled from the four instrumented beams 56 (two gage 58 signals per beam 56) (block 102). The eight sampled gage 58 signals are grouped into four unique sets of six signals each, such that each set includes the gage 58 signals from three of the four instrumented beams 56 (block 104). A set of six sampled gage 58 signals is multiplied by a unique calibration matrix relating that particular set to force and torque values (block 106). This process is repeated for all four sets of sampled gage 58 signals (block 108). The force and torque values are output (block 110), which may comprise outputting one of the four sets of force and torque values, or outputting the average of all four sets of values. The four sets of force and torque values are compared (block 112). If one of the sets of force and torque values differs from the other three by greater than a predetermined tolerance (block 114), a fault is signaled (block 116). If all four sets of force and torque values agree (block 114), then at a predetermined interval, the method is repeated, beginning at step 102 by sampling new gage 58 signals.

As used herein, the term "deformable beam," or simply "beam," is to be construed broadly, as any mechanical connection between the TAP and MAP of a force/torque sensor, the deformation of which can be sensed and/or quantized by transducers, such as strain gages, affixed to surfaces thereof. In particular, the term "beam" is not limited to the spoke-like structures depicted in the drawing figures of the present application. For example, the bridging elements 17 of U.S. Pat. No. 4,823,618 are beams within the context of embodiments of the present invention, as are the curved segments 13-16 of U.S. Pat. No. 4,488,441. These examples are illustrative of the broad scope of the term "beam," as used herein, and are not limiting.

Embodiments of the present invention present numerous advantages over prior art force/torque sensors. Providing redundant instrumented deformable beams allows detection of a fault by calculating force/torque solutions using the inputs from different combinations of instrumented beams, and comparing the results. Furthermore, in some embodiments, the force/torque sensor 50 may remain operative and capable of measuring and reporting forces and torques following a fault. By providing n≥4 deformable beams total, instrumentation of at least four beams is assured.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A force and torque sensor comprising:
a Tool Adapter Plate (TAP) operative to be connected to a first object:
a Mounting Adapter Plate (MAP) operative to be connected to a second object;
a number n of deformable beams connecting the TAP to the MAP, wherein n≥4;
instrumentation comprising strain gages affixed to surfaces of four of the n deformable beams; and
a measurement circuit operative to
separately resolve a direction and a magnitude of force and torque between the first and second objects, in response to electrical signals from strain gages on four different combinations of three of the four instrumented beams, yielding four resolutions,
compare resolved force and torque outputs of the four resolutions, and
signal a fault if at least one of the four force and torque outputs differs from the other force and torque outputs by more than a predetermined tolerance.

2. The sensor of claim 1 wherein
the first object is a robotic tool or a mechanical coupling to a robotic tool; and
the second object is a robotic arm or a mechanical coupling to a robotic arm.

3. The sensor of claim 1 wherein the measurement circuit operative is further operative to output unique resolved force and torque outputs if, in the comparison step, three of the four resolutions agree within a predetermined tolerance and one resolution disagrees.

4. The sensor of claim 1 wherein the instrumentation comprises four strain gages, one gage affixed to each surface of an instrumented beam, the gages on opposite sides of each beam wired together in half bridge topology, such that each instrumented beam outputs two gage signals.

5. The sensor of claim 4 wherein resolving a direction and a magnitude of force and torque between the first and second objects for each combination of three instrumented beams comprises multiplying six gage signals by a 6×6 calibration matrix to yield six force and torque values.

6. The sensor of claim 5 wherein the strain gages affixed to two of the four instrumented beams are longer than the strain gages affixed to the other two of the four instrumented beams, and wherein the longer gages will fail sooner than the shorter strain gages under a same excessive applied force or torque.

7. A method of detecting a fault in a calibrated force and torque sensor having a number n of deformable beams, wherein n≥4, and wherein four of the n deformable beams are instrumented so as to generate two gage signals each, comprising:
iteratively sampling eight gage signals from the four instrumented beams;
grouping the eight gage signals into four unique sets of gage signals, wherein each set includes gage signals from three of the four instrumented beams;
multiplying each set of sampled gage signals by a separate calibration matrix relating that set to force and torque values to yield four resulting sets of force and torque values;
outputting one of, one set of force and torque values, or the average of the four sets of force and torque values;
comparing the four sets of force and torque values; and
if one of the four sets of force and torque values differs from the other three by more than a predetermined tolerance, signaling a sensor fault.

8. The method of claim 7 wherein
grouping the eight gage signals into four unique sets of gage signals comprises grouping the eight gage signals into four unique sets of six signals each; and
multiplying each set of sampled gage signals by a separate calibration matrix comprises multiplying each set of six sampled gage signals by a separate calibration matrix.

9. The method of claim 7 further comprising, after the comparing step:
if three of the four sets of force and torque values agree within the predetermined tolerance, outputting set of force and torque values that disagrees with the other three.

10. The method of claim 7 wherein the comparing step is performed less frequently than the sampling, grouping, multiplying, and outputting steps.

11. The method of claim 7 further comprising:
upon initialization, applying a known force or torque to the sensor and verifying that the sensor outputs the proper force and torque values, to ensure the sensor was not damaged during power-off.

* * * * *